United States Patent
Abbott et al.

(10) Patent No.: US 11,906,399 B2
(45) Date of Patent: Feb. 20, 2024

(54) SAMPLER TRIGGER MECHANISM

(71) Applicant: Schlumberger Technology Corporation, Sugar Land, TX (US)

(72) Inventors: Brian Abbott, Missouri City, TX (US); Ian James Mainwaring, Aberdeen (GB); Akhil Bahl, Richmond, TX (US); Carlos Merino, Bagneux (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 609 days.

(21) Appl. No.: 17/038,653

(22) Filed: Sep. 30, 2020

(65) Prior Publication Data
US 2021/0096044 A1 Apr. 1, 2021

Related U.S. Application Data

(60) Provisional application No. 62/908,290, filed on Sep. 30, 2019.

(51) Int. Cl.
| | | |
|---|---|---|
| *G01N 1/10* | (2006.01) | |
| *E21B 49/08* | (2006.01) | |
| *F16K 17/40* | (2006.01) | |
| *E21B 49/10* | (2006.01) | |

(52) U.S. Cl.
CPC .............. *G01N 1/10* (2013.01); *E21B 49/08* (2013.01); *E21B 49/081* (2013.01); *F16K 13/04* (2013.01)

(58) Field of Classification Search
CPC ......... G01N 1/10; E21B 49/08; E21B 49/081; E21B 49/10; E21B 2200/00; F16K 13/04
See application file for complete search history.

(56) References Cited

U.S. PATENT DOCUMENTS

| | | | |
|---|---|---|---|
| 5,058,674 A | 10/1991 | Schultz et al. | |
| 9,140,116 B2 | 9/2015 | Atkinson et al. | |
| 9,708,909 B2 | 7/2017 | Atkinson et al. | |
| 10,502,024 B2 | 12/2019 | Wang et al. | |
| 2007/0236215 A1 * | 10/2007 | Innes ................... | E21B 49/082 324/303 |
| 2011/0056679 A1 | 3/2011 | Rytlewski | |
| 2012/0013292 A1 | 1/2012 | Ali et al. | |

(Continued)

FOREIGN PATENT DOCUMENTS

| | | | | |
|---|---|---|---|---|
| GB | 2264172 A | * | 8/1993 | ............. E21B 49/08 |
| WO | 2015006424 A1 | | 1/2015 | |

OTHER PUBLICATIONS

Combined Search and Exam Report under Sections 17 and 18(3) issued in United Kingdom Patent application No. GB2015529.7 dated Jun. 8, 2021, 9 pages.

(Continued)

*Primary Examiner* — Herbert K Roberts
*Assistant Examiner* — Anthony W Megna Fuentes
(74) *Attorney, Agent, or Firm* — Jeffrey D. Frantz (57) ABSTRACT

A well sampling apparatus is described herein. The well sampling apparatus includes one or more pressure-activated samplers in a sampling assembly. The samplers are coupled to an activating mechanism that includes a remotely activated local actuator. The remotely activated local actuator is coupled to a pressure source that, when released by the remotely activated local actuator, operates the pressure-activated sample to obtain a sample fluid.

19 Claims, 8 Drawing Sheets

(56) References Cited

U.S. PATENT DOCUMENTS

2012/0285702 A1   11/2012  Rytlewski
2013/0319102 A1   12/2013  Ringgenberg et al.
2018/0051535 A1*  2/2018  Wang ..................... E21B 34/10

OTHER PUBLICATIONS

Exam Report under Section 18(3) issued in United Kingdom Patent application No. GB2015529.7 dated Sep. 21, 2022, 3 pages.

* cited by examiner

SAMPLER TRIGGER MECHANISM

CROSS-REFERENCE TO RELATED APPLICATIONS

This patent application claims benefit of U.S. Provisional Patent Application Ser. No. 62/908,290 filed Sep. 30, 2019, which is incorporated entirely herein by reference.

FIELD

Embodiments herein generally relate to oil and gas drilling operations, and specifically to methods and apparatus for sampling fluids in a well bore.

BACKGROUND

During well testing, samples are sometimes collected from a well bore. A tubular assembly with a number of tools is lowered into the well bore to accomplish the sampling. The tubular assembly can have samplers, triggering mechanisms, and sensors for determining conditions and location within the well bore. A tubular member of the tubular assembly provides a barrier between the well bore and the stream of fluid produced from the reservoir. The goal is to trigger the samplers to obtain a sample of that fluid at an advantageous location and/or time. If the sample is taken too early or too late, the samplers may be in the wrong location and the sample might not represent the area of interest in the well bore. Additionally, or alternately, if the sample is taken too early or too late, the fluid within the tubular member of the tubular assembly might not contain reservoir fluid under conditions desired for sampling, which may result in capturing samples that are not representative of the reservoir fluid.

Commonly, samplers are actuated by pressure application mechanisms that fire to trigger operation of the sampler. The pressure application mechanism can rely on ambient downhole pressure, for example using a passive rupture disk that ruptures when well pressure reaches a desired value. Ambient pressure from the well ruptures the disk and actuates the samplers. A timer can be used to trigger pressure application to the samplers in some cases. In other cases, communication from the surface, for example using electronic or acoustic means, can be used to trigger rupture of a barrier to well pressure. In some cases, however, ambient downhole pressure might not be sufficient to trigger a sampler. There is a need for improved sampler triggering mechanisms and methods.

SUMMARY

Embodiments described herein provide a sampling assembly, comprising a pressure-activated sampler; an actuated pressure applicator fluidly coupled to the pressure-activated sampler, the actuated pressure applicator comprising a remotely-operated local actuator; and a pressure source within the sampling assembly and coupled to the remotely-operated local actuator.

Other embodiments described herein provide a sampling assembly, comprising a plurality of pressure-activated samplers; a plurality of actuated pressure applicators fluidly coupled to the pressure-activated samplers, each actuated pressure applicator comprising a remotely-operated local actuator; a pressure source located within the sampling assembly and coupled to the remotely-operated local actuator; and a controller configured to receive a signal representing one of the plurality of pressure applicators and to activate the pressure applicator represented by the signal.

Other embodiments described herein provide a sampling assembly, comprising a pressure-activated sampler; an actuated pressure applicator comprising an electronic rupture disk; and a pressure source housed within the sampling assembly.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The downhole sampling mechanisms described herein have locally actuated pressure applicators to provide dependable, reproducible activation of samplers for downhole sampling. The pressure applicators can be designed to have uniform properties such that activation failures due to unreliable stimuli can be minimized. The pressure applicators generally have a pressurized gas housed in an enclosure with a remotely operated release actuator. When released, the pressurized gas travels along a defined route to reach a sampler. The gas is housed at a pressure that enables the pressurized gas to apply sufficient pressure to the sampler, upon reaching the sampler, to activate the sampler. Well pressure applicators can optionally be included as backup pressure applicators in the event power or communication to the locally actuated pressure activators are interrupted.

Figure 1:
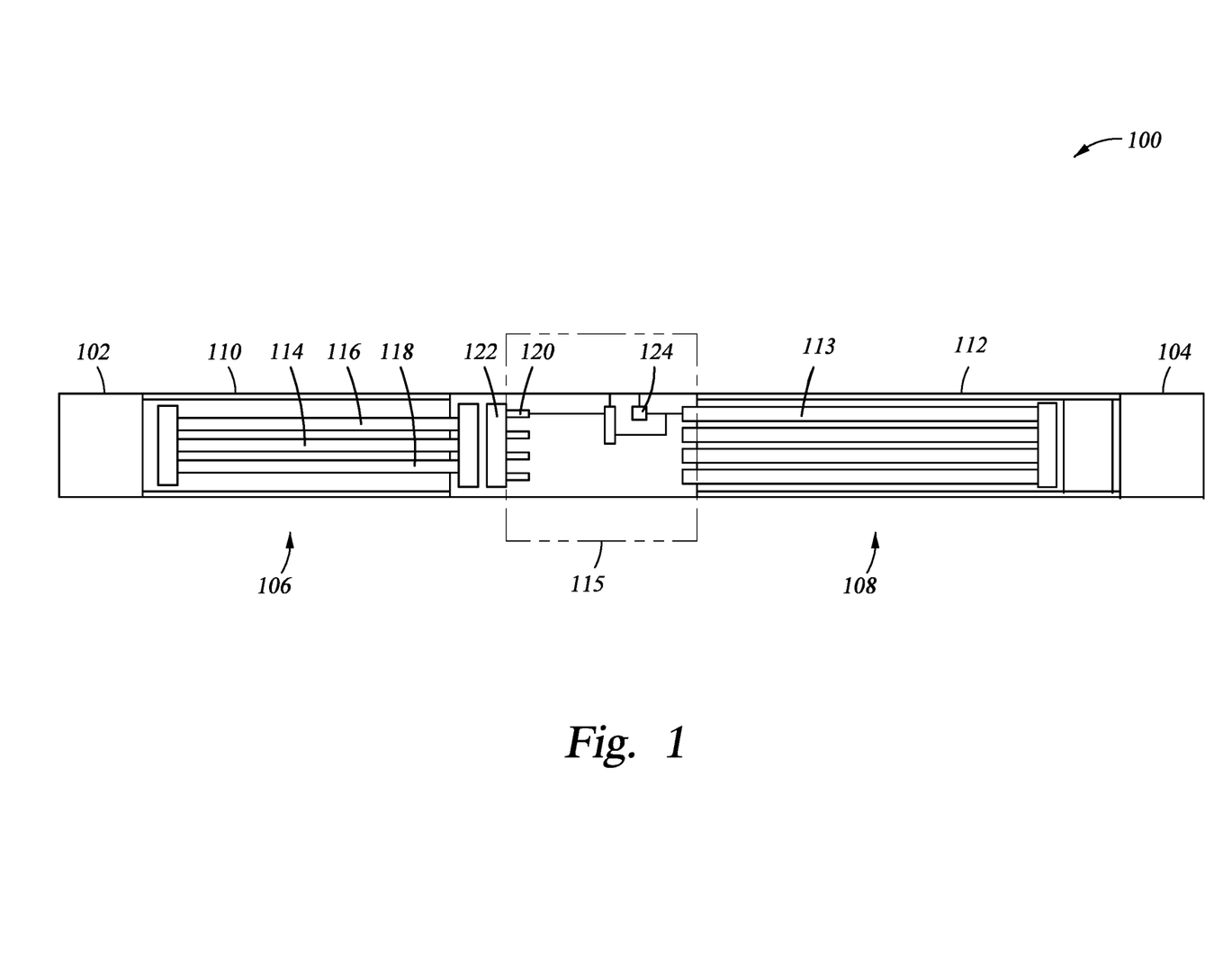
FIG. 1 is a schematic diagram summarizing the design architecture of a sampling mechanism according to one embodiment.

FIG. 1 is a schematic diagram summarizing the design architecture of a sampling mechanism 100 according to one embodiment. The sampling mechanisms described herein, including the sampling mechanism 100, use an electronic rupture disk and pressurized capsule as a locally actuated pressure applicator to trigger operation of samplers. The sampling mechanism 100 has a top sub 102 and a bottom sub 104 housing a control assembly 106 and a sampling assembly 108. A first housing 110 is coupled to the top sub 102 and a second housing 112 is coupled to the bottom sub 104. The top sub 102, bottom sub 104, first housing 110, and second housing 112 all have cylindrical profiles in many cases, but any cross-sectional profile would work with the sampling mechanisms described herein.

The first housing 110 houses components of the control assembly 106 and the second housing 112 houses components, chiefly samplers 113, of the sampling assembly 108. The control assembly 106 includes a power source 114, a communication member 116, and an electronic activator 118. The power source 114 may be a battery, or a wire to a surface or other remote power source. The communication member 116 may be an electronic, optical, or acoustic modem, which may be wired or wireless. The electronic activator 118 may be an activator for an electronic rupture disk, or other electronic actuator. The power source 114 generally powers electronic components of the communication member 116 and the electronic activator 118. The communication member 116 generally sends and receives signals, which may include data signals from sensors included in the sampling mechanism 100 and/or operating signals from surface control units. The communication member 116 also receives and sends signals to activate samplers. When a signal is received by the communication member 116, the communication member 116 can respond by sending a signal to activate a sampler 113. The samplers 113 are typically exposed to downhole fluids to be sampled. In many cases, downhole fluids flow through the subs 102, 104, and 115, and the housings 110 and 112 to come into contact with the samplers 113.

A sampling sub 115 joins the first housing 110 and the second housing 112. The sampling sub 115 houses components of a mechanism that can activate the samplers 113. The electronic activator 118 is coupled to one or more electronic actuators 120, positioned within the sampling sub 115 by a positioner 122. In some embodiments, the positioner 122 may be an electrical connectivity member that provides electrical connectivity among the communication member 116, the electronic activator 118, and the electronic actuators 120. The electronic actuators 120 may be electronic rupture disks that provide a pressure barrier until ruptured. When ruptured, the electronic rupture disk can be configured to release pressure from a pressure member to activate one or more samplers 113. Alternately, or additionally, a mechanical rupture disk 124 can be provided to activate the sampler 113. The mechanical rupture disk 124 is a passive pressure release that generally provides a pressure barrier between the ambient well pressure outside the sampling mechanism 100 and the pressure inside the sampling mechanism 100, specifically inside the mechanical rupture disk 124. Either or both the electronic actuator 120 and the mechanical rupture disk 124 can be used to actuate the samplers 113. Using a sampling sub that features an electronic device as the primary activator and a mechanical device as backup, for example, can provide redundancy in the event of power or communication loss. The mechanical device can operate without power or communication to capture samples even when power and/or communication are lost to the sampling mechanism 100.

Figure 2:
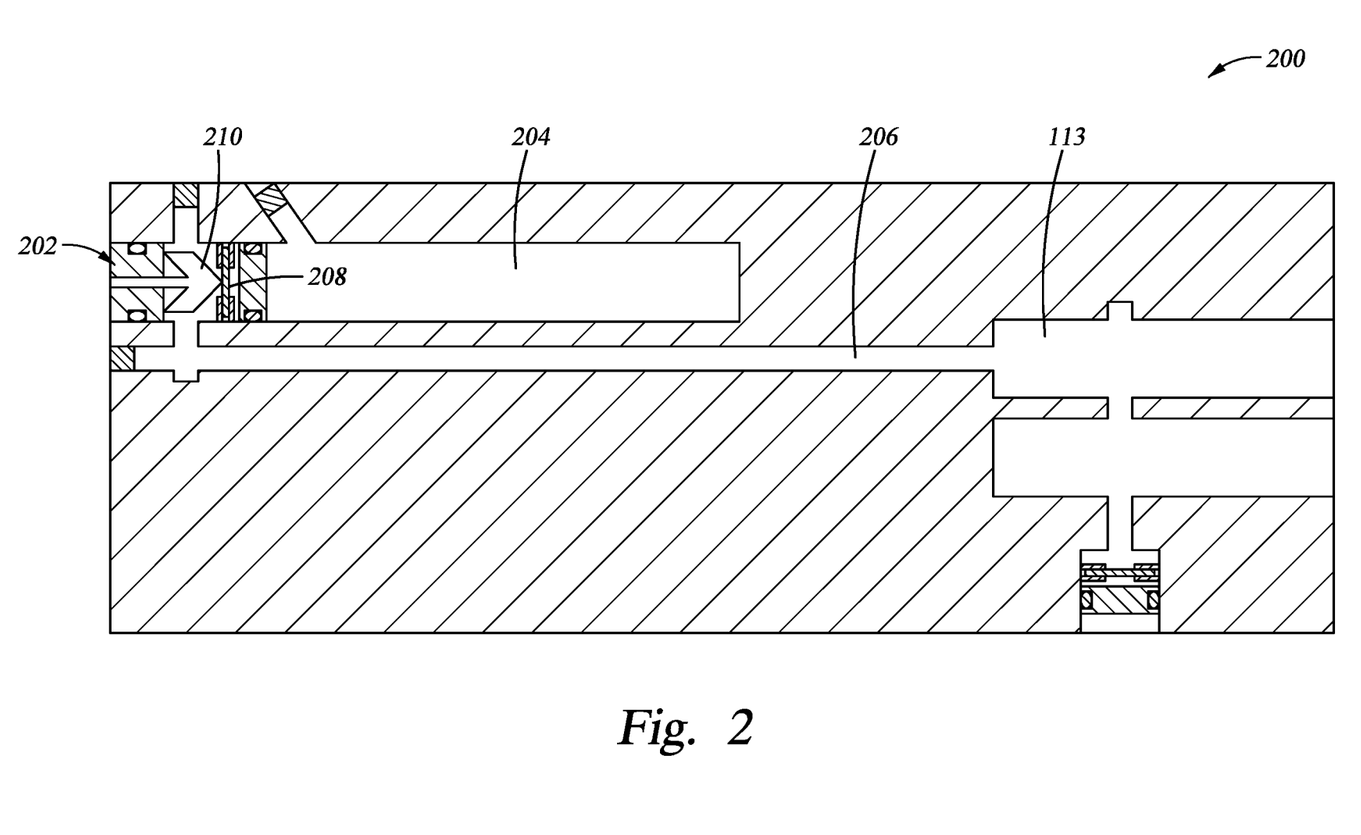
FIG. 2 is a schematic view of a sampling mechanism according to one embodiment.

FIG. 2 is a schematic view of a sampling mechanism 200 according to one embodiment. The sampling mechanism 200 includes an electronic rupture disk 202 coupled to a pressure member 204, both within the confines of a housing, which can be any of the housings described herein. The sampling mechanism 200 can be housed in the sampling sub 115 of FIG. 1, or in any convenient part of a downhole tool. The electronic rupture disk 202 acts as a remotely operated release that provides a flow barrier between the pressure member 204 and a conduit 206 that fluidly couples one or more of the samplers 113 to the electronic rupture disk 202. A pressurized gas, such as nitrogen or other suitable gas, is stored in the pressure member 204 at a pressure selected to activate the samplers 113 when released into the conduit 206. The electronic rupture disk 202 has a disk 208 and an actuator 210 that can be operated electronically to pierce the disk 208. The disk 208 provides a flow barrier preventing flow of the pressurized gas from the pressure member 204 into the conduit 206. When the actuator 210 is operated electronically, for example by receiving a signal from the communication member 116 of FIG. 1, the disk 208 is ruptured, and the pressurized gas from the pressure member 204 flows into the conduit 206, reaching and activating the samplers 113. Instead of, or in addition to, an electronic rupture disk, an electronically operated valve, or valve operated by another suitable remote mechanism such as acoustic and pneumatic, can be used.

The conduit 206 is sized and routed to allow the electronic rupture disk 202 to be positioned at a location to use the disk 208 as a barrier to contain the pressurized gas of the pressure member 204 and to allow the pressurized gas to expand into the conduit 206 to achieve a target pressure for activating the sampler or samplers 113. The pressure of the pressurized gas is selected, based on the volume from the disk 208 to the sampler 113 so that expansion of the gas into the conduit lowers the pressure of the gas, substantially according to the Ideal Gas Law, to provide an activating pressure according to the specification of the sampler 113. The conduit can be routed in any convenient manner to provide enough volume for expansion of the pressurized gas. For example, if necessary, the conduit can be looped or rastered any number of times to provide a target expansion volume. The pressure of the pressure member 204 is limited at the high end by the pressure specification of the disk 208 and the electronic rupture disk 202 and at the low end by the pressure needed to activate the sampler 113. The sampler activation pressure can be configured by specifying resistive components of the sampler 113, as described further below.

In general, the sampling apparatus described herein can be included with other components of a downhole tool such as, but not limited to, telemetry units, perforation tools, valves, loggers, packers, and the like. In particular, some embodiments of the sampling mechanisms described herein can be used to collect samples from a region of a well below a packing or sealing device using a signal, such as an acoustic signal, to activate the pressure applicator.

It should be noted that other types of pressure applicators can use other types of pressure release mechanisms. In some cases the pressure member 204 may have a depressible barrier, for example a needle valve or other barrier, that contains gas within the pressure member 204 until the barrier is depressed. Such a barrier may be disposed within the pressure member against an external opening such that pressure within the pressure member urges the barrier against the external opening to prevent pressure loss. The electronic rupture disk 202 can be replaced, in this embodiment, with a simple linear actuator that depresses the barrier into the pressure member releasing the gas. In other cases, the pressure member may have an actuated valve, such as a quarter turn valve or ball valve that releases pressure when an electronic actuator operates the valve.

Figure 4:
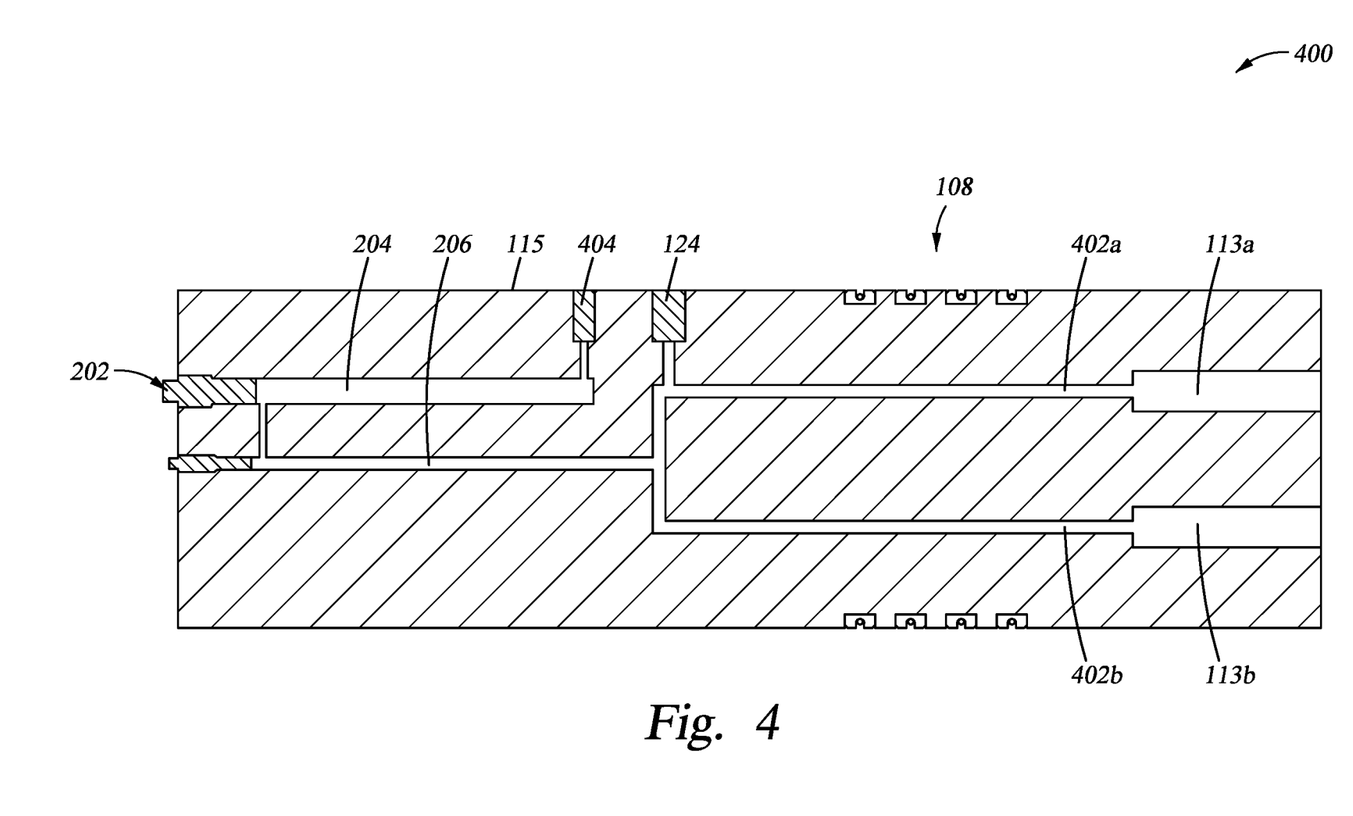
FIG. 4 is a detail view of a sampling mechanism according to another embodiment.

FIG. 4 is a detail view of sampling mechanism 400 according to another embodiment. The sampling mechanism 400 includes the electronic rupture disk 202 and conduit 206. In FIG. 4, the sampling mechanism 400 is mainly in the sampling sub 115, which is to say the pressure applicator comprising the electronic rupture disk 202 and the pressure member 204 are located within the sampling sub 115. Here, the conduit 206 separates, within the sampling assembly 108, into multiple sub-conduits 402. Here, two sub-conduits 402a and 402b are shown, along with two samplers 113a and 113b. Thus, in this case, two pressure-activated samplers are activated by one pressure applicator. The pressurized gas released from the pressure member 204 by the electronic rupture disk 202 flows into the sub-conduit 402a and 402b to activate the respective samplers 113a and 113b. The mechanical rupture disk 124 is also shown here coupled to the sampling assembly 108 to provide a flow pathway from outside the sampling mechanism to the conduit 206 and the sub-conduits 402a and 402b to actuate the samplers 113a and 113b using ambient well pressure.

In FIG. 4, the sampling sub 115 has a charge valve 404 formed through an outer wall of the sampling sub 115 to the pressure member 204. The charge valve 404 provides a controlled flow pathway to add pressurized gas to the pressure member 204. This is typically done at the surface before the sampling apparatus is lowered into the well. The charged pressure member 204 can then be triggered later by operation of the electronic rupture disk 202.

The structure shown in FIG. 4 can be adapted to provide any numerical mapping of pressure applicators to samplers. For example, one pressure applicator can activate three pressure applicators, if desired. Further, different mappings of pressure applicators to samplers can be included in one sampling mechanism, if desired. For example, one pressure applicator in a sampling mechanism might activate one sampler while another pressure applicator in the sampling mechanism might activate two or more samplers.

Figure 5:
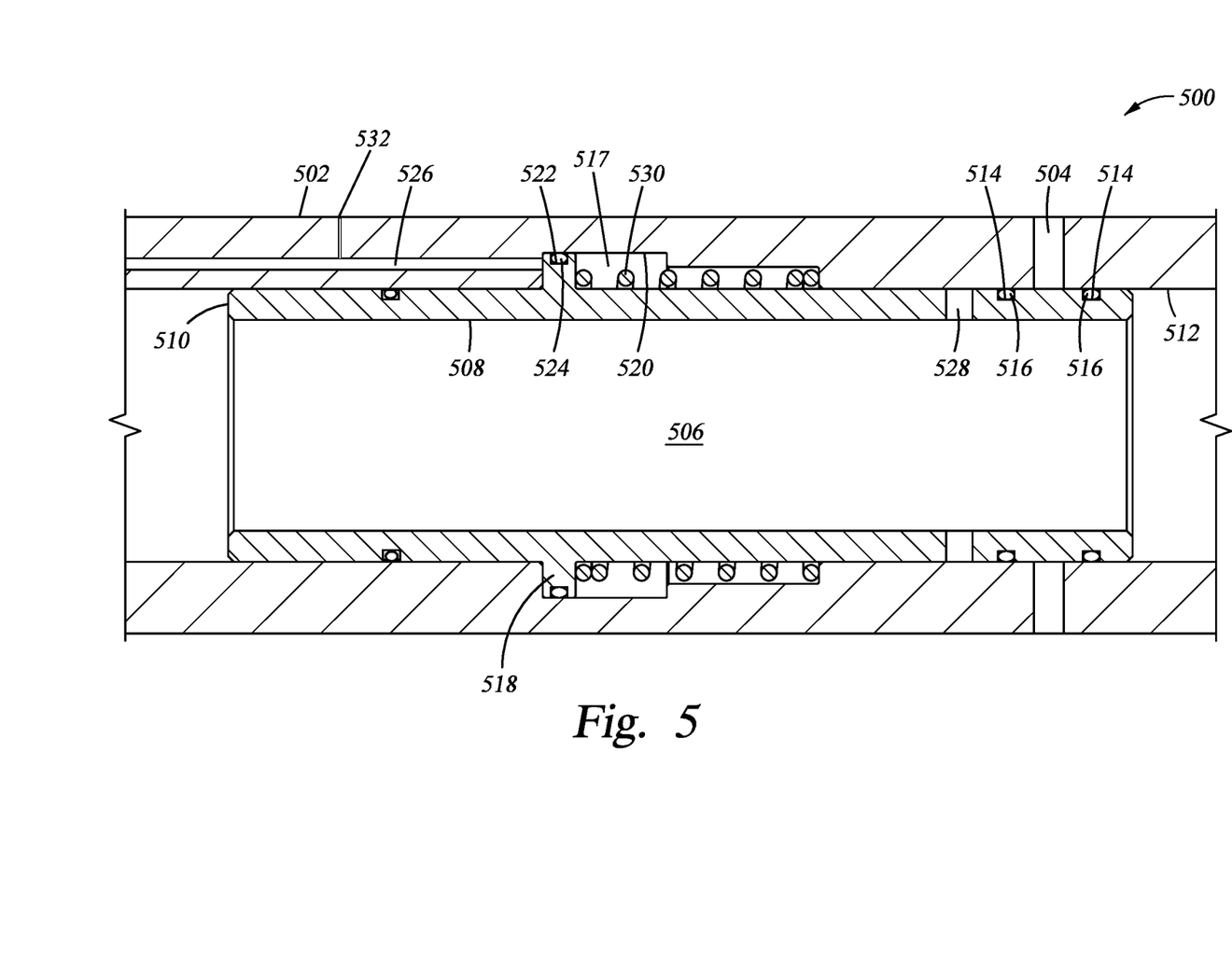
FIG. 5 is a cross-sectional view of a sampler that can be used with the various apparatus described elsewhere herein.

FIG. 5 is a cross-sectional view of a sampler 500 that can be used with the various apparatus described elsewhere herein. The sampler 500 can be activated using pressurized gas from a pressure member, as described above, or from ambient well pressure. The sampler 500 has an outer wall 502 through which one or more openings 504 is provided. The openings 504 provide a flow pathway for fluids outside the sampler 500 to enter an interior 506 of the sampler 500 when the flow pathway is not blocked. A sleeve 508 is positioned within the outer wall 502 such that an outer surface 510 of the sleeve 508 is in contact with an inner surface 512 of the outer wall 502. The sleeve 508 is able to slide along the inner surface 512 of the outer wall. Seals 514 are positioned in grooves 516 formed in the outer surface 510 of the sleeve 508 on either side of the opening 504 of the outer wall 502.

The outer wall 502 has a recess 517, which may be annular, formed in the inner surface 512 thereof. A projection 518 of the sleeve 508 extends from the outer surface 510 of the sleeve 508 into the recess 517 to contact a recess wall 520. A projection seal 522 is formed in the projection 518 in an outer surface 524 of the projection 518 that contacts the recess wall 520. A pressure conduit 526 is formed longitudinally through the outer wall 502, ending at the recess 517. The pressure conduit 526 provides a pathway for pressurized gas to apply force to the projection 518 to actuate the projection 518, and the sleeve 508, axially within the outer wall 502. The sleeve 508 has a sleeve opening 528 that, when aligned with the opening 504, provides fluid communication between the interior 506 of the sampler 500 and the exterior of the sampler 500. A resilient member 530, for example a spring or a volume of compressible material such as a gas, can be disposed within the recess 517 on a side of the projection 518 opposite from the side of the projection 518 facing the pressure conduit 526. When pressure in the pressure conduit 526 exceeds the minimum compressive force of the resilient member 530, the projection 518 and the sleeve 508 are actuated axially to bring the openings 504 and 528 closer together, and ultimately into alignment, to open the sampling pathway. When pressure in the pressure conduit 526 relaxes, the compressive force of the resilient member 530 predominates, returning the projection 518 and the sleeve 508 to a position that unaligns the openings 504 and 528, blocking the sampling pathway and deactivating the sampler 500. In this way, the sampler 500 works with the activating mechanisms described elsewhere herein to capture samples upon actuation of the sleeve by pressure released when the pressure applicators described herein are deployed.

The projection 518 is shown here as an annular ring extending outward from the outer surface 510 of the sleeve 508. As pressure in the pressure conduit 526 moves the sleeve 508 axially, gas from the pressure conduit 526 fills an annular space that opens between the annular projection 518 and a wall of the recess 517. It should be noted that the projection 518 may be a tab that extends outward from the outer surface 510 of the sleeve 508 for a short circumferential portion of the outer surface 510, instead of a full annular projection. In such an embodiment, the recess 517 would also not be fully annular, but would match the size and shape of the tab. The resilient member in such an embodiment would not encircle the sleeve 508, as shown in FIG. 4, but would reside within the recess 517.

Figure 3:
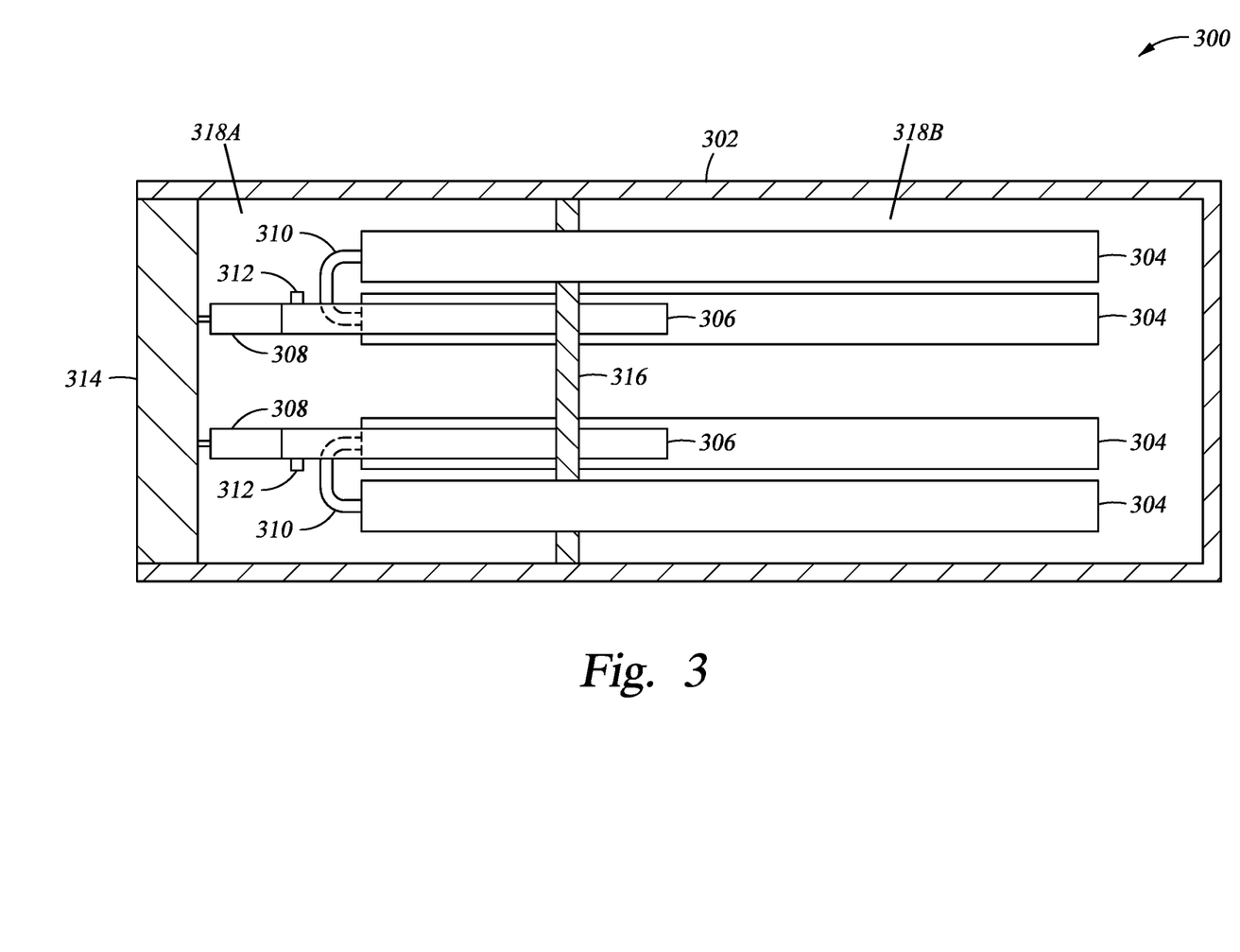
FIG. 3 is a schematic view of a sampler according to another embodiment.

FIG. 3 is a schematic view of a sampler 300 according to another embodiment. Here, the sampler 300 includes an activating mechanism within the sampler itself. The sampler 300 features a housing 302 that holds a plurality of sampler units 304, a plurality of pressure members 306, a controller 314 and an activator 308 for each pressure member 306. Each pressure member 306 is fluidly connected to at least one sampler unit 304 by a conduit 310. Each pressure member 306 also has a charging port 312. The components of the sampler 300 are securely positioned within the housing by a positioner 316. The positioner 316 may also function to seal the interior of the housing 302, if desired, forming two internal chambers 318A and 318B such that the activators 308 and controller 314 are not exposed to downhole fluids. In this case, a first internal chamber 318A would contain the activating mechanism of the sampler 300 (activators 308 and controller 314) while a second internal chamber 318B just contains portions of the sampler units 304 and the pressure member 306 that can be exposed to downhole fluids without unpleasant consequences.

The controller 314 energizes an activator 308, which may be a release member such as an electronic rupture disk or other actuator as described above, to release gas held under pressure in a pressure member 306. The released gas travels through one or more of the conduits 310 to a sampler unit 304, which is activated as described above. As also described above, the pressure of the gas in the pressure members 306 is selected such that upon expansion into the conduit 310 and arrival at the sampler unit 304, the gas has a pressure sufficient to activate the sampler unit 304 by displacing the sleeve 508, as described in connection with FIG. 5. As above, the activator 308 and pressure member 306 define a pressure applicator that functions to activate a sampler unit 304.

Pressure can be relieved to close the samplers after a time, if desired. Referring again to FIG. 5, pressure in the pressure conduit 526 urging the projection 518 against the resilient member 530 can be relieved to close the sampler 500. In one case, a small relief conduit 532 can be formed through the outer wall 502 to place the pressure conduit 526 in fluid communication with an exterior of the sampler 500. The conduit 526 is sized to bleed pressure from the conduit 526 over a time period that allows pressure in the conduit 526 to stay above the threshold pressure to open the sampler 500 for a time period long enough to capture a sample, after which time pressure in the conduit 526 drops below the threshold pressure and the sampler 500 closes. Here, the relief conduit 532 fluidly connects the conduit 526 with an exterior of the sampler 500, but in other embodiments the conduit 532 may fluidly connect the pressure conduit 526 with a letdown plenum located at a convenient location within the sampler 500, for example within the sampling sub 115 of FIG. 1, within the bulk of the sampling mechanism 200 of FIG. 2, or within the housing 302 of FIG. 3.

If a closure mechanism, as described above, is used, the timing of pressure release into the pressure conduit 526 and release of pressure from the pressure conduit 526 through the relief conduit is selected to provide pressure within the pressure conduit 526 for a time sufficient to actuate the sleeve 508 long enough to capture the desired sample. The timing can be selected by choosing a release mechanism to release pressure from the pressure member (204 or 306) that is fast enough to achieve pressure above the activation threshold of the sampler for the desired time period.

Figure 6:
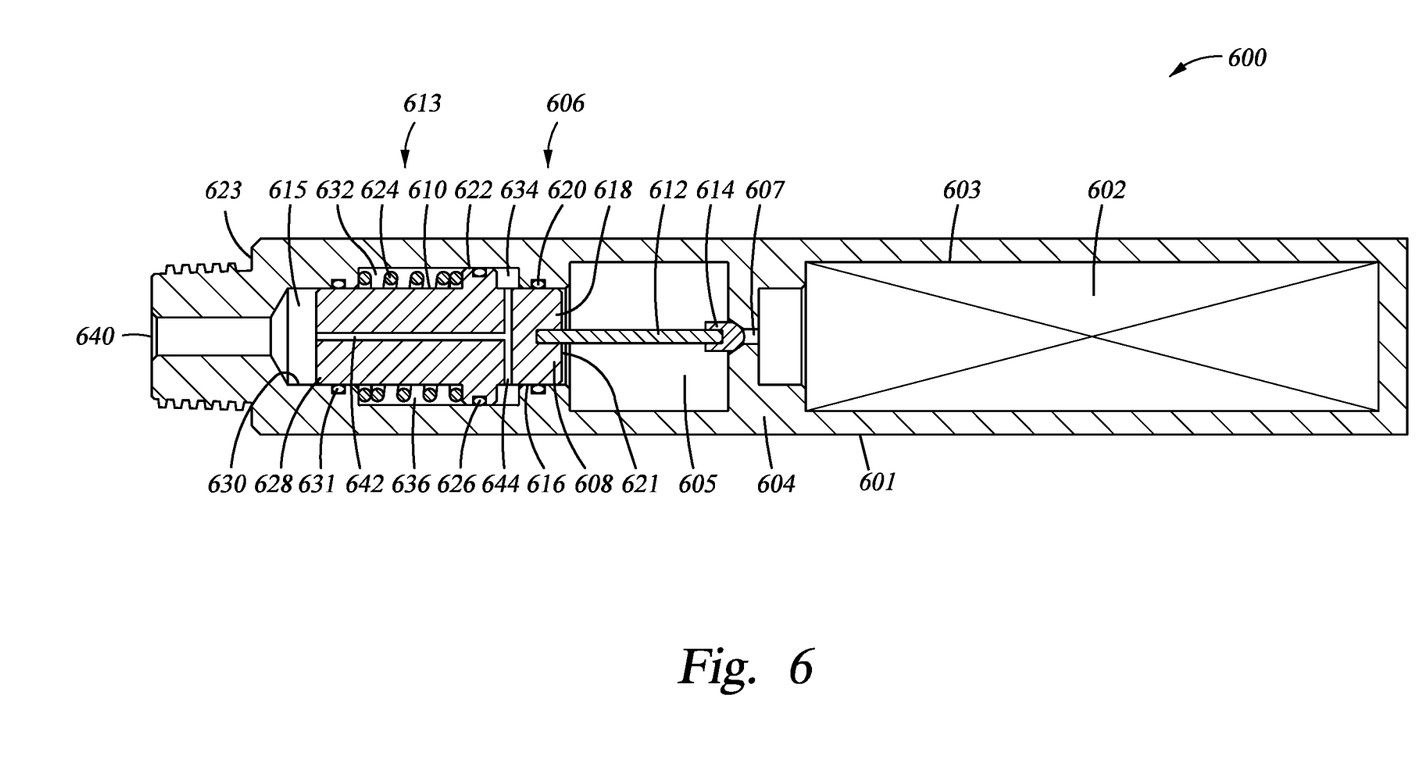
FIG. 6 is a cross-sectional view of a sampler according to another embodiment.

FIG. 6 is a cross-sectional view of a sampler 600 according to another embodiment. The sampler 600 can be activated using pressurized gas from a local pressure source, as described above, from a remote pressure source, such as a surface pressure source, or from ambient well pressure. The sampler 600 uses a fluidically operated sampling mechanism 602 that is known in the art. The fluidically operated sampling mechanism 602 relies upon the release of an incompressible fluid to open the sampling mechanism 602 and capture a sample. The sampler 600 has a body 601 that contains the sampling mechanism 602 in a sampling chamber 603. The body 601 has a partition 604 that separates the sampling chamber 603 from a displacement chamber 605. A port 607 disposed through the partition 604 provides a pathway for the incompressible fluid, for example a hydraulic oil, to flow from the sampling chamber 603 to the displacement chamber 605. The sampling chamber 603 is originally charged with the incompressible fluid, and the sampling mechanism 602 is operated by releasing the incompressible fluid to flow from the sampling chamber 603 to the displacement chamber 605 through the port 607. Here, the incompressible fluid functions as the pressure source that actuates the sampler 600.

The sampler 600 has a pressure-activated release mechanism 606 that releases the incompressible fluid from the sampling chamber 603. The incompressible fluid functions as a pressure source housed within the sampler 600 that, upon release, opens the sampling chamber 603. The pressure-activated release mechanism 606, along with the incompressible fluid, defines an actuated pressure applicator that is within the sampler 600. A valve 614 is disposed in the port 607 to regulate flow of the incompressible fluid from the sampling chamber 603 to the displacement chamber 605. The valve 614 is connected to a linkage 612 that extends axially through the displacement chamber 605 to connect to an actuator mechanism 610 disposed in an actuator portion 613 of the sampler 600. The displacement chamber 605 of the sampler 600 is between the actuator portion 613 and the sampling chamber 603. The actuator mechanism 610 comprises a plunger 608 and a retention member 624, both of which are disposed in an interior 615 of the actuator portion 613. Here, a passage 616 connects the interior 615 of the actuator portion 613 to the displacement chamber 605.

The plunger 608 has a nose 618 that extends into the passage 616 and connects to the linkage 612 to move the valve 614 axially in the actuator portion 613. A seal element 620 is disposed in a circumferential groove formed in the inner wall of the passage 616 to seal against the nose 618 of the plunger, thus preventing fluid communication between the interior 615 of the actuator portion 613 and the displacement chamber 605. The plunger 608 also has a flange 622 that extends radially outward toward the inner wall of the interior 615 of the actuator portion 613. A seal element 626 is disposed in a circumferential groove formed in an outer wall of the flange 622 to seal against the inner wall of the interior 615 of the actuator portion 613. The plunger 608 also has a tail 628, the flange 622 of the plunger 608 being located between the nose 618 and the tail 628.

The passage 616 connecting the interior 615 of the actuator portion 613 with the displacement chamber 605 is at a first end 621 of the actuator portion 613. The actuator portion 613 has a recess 630 at a second end 623 of the actuator portion 613 opposite from the first end. The recess 630 accommodates the tail 628 of the plunger 608, which has an outer radius substantially the same, within a tolerance, of the inner radius of the recess 630. A seal element 631 is disposed in a circumferential groove formed in the tail 628 to seal against the inner wall of the recess 630, thus preventing fluid communication around the plunger 608.

The plunger 608 and the inner wall of the actuator portion 613 define an annular chamber 632, which is separated into two parts by the flange 622 of the plunger 608. A first part 634 of the annular chamber 632 is between the flange 622 and the first end 621, while a second part 636 of the annular chamber is between the flange 622 and the second end 623. The retention member 624 is disposed in the second part 636 of the annular chamber. The retention member 624 is a member that is compressible to provide a restorative force when compressed. The retention member 624 can be a spring or other resilient object to provide a compression-reactive force. In some embodiments, the retention member 624 can be a gas. Here, the retention member 624 is shown occupying the annular chamber 632 and surrounding the plunger 608. In other embodiments, the retention member 624 may occupy only part of the annular chamber 632, extending only partway around the plunger 608. In such embodiments, a subchamber of the annular chamber 632 can be defined by adding a partition to contain the retention member 624.

In the primed state described above, the valve 614 contains the incompressible fluid in the sampling chamber 603. The retention member 624 provides a sealing force that is transmitted through the plunger 608 and the linkage 612 to the valve 614. The sealing force is variable depending on compression of the retention member 624. The mechanism 606 described above provides an additional pressure relief function to prevent overpressure in the sampling chamber 603 when the sampler 600 is in the primed state. If the incompressible fluid in the sampling chamber 603 reaches a threshold pressure, for example due to thermal forces, the retention member 624 will yield and the valve 614 will open, releasing the incompressible fluid to flow into the displacement chamber 605, relieving the overpressure.

A pressure conduit 640 fluidly connects to the recess 630 at the second end 623 of the actuator portion 613 and provides fluid connection to a pressure source (not shown) to actuate the sampler 600. An axial conduit 642 is formed within the plunger 608 extending from the tail 628 end of the plunger 608 to a location between the flange 622 and the nose 618 of the plunger 608. One or more lateral conduits 644 connect to the axial conduit 642 and extend radially outward to the side surface of the plunger 608. The lateral conduits 644 emerge at openings between the flange 622 and the nose 618.

The sampler 600 is activated when pressurized fluid from a pressure source or from ambient well pressure is supplied to the pressure conduit 640. The pressurized fluid is directed through the axial conduit 642 in the plunger 608 of the actuator mechanism 610 by the seal element 631. The pressurized fluid flows into the first part 634 of the annular chamber of the actuator portion 613 and is confined by seal elements 620 and 626. The pressurized fluid thus generates a force. If sufficient pressure is supplied, the force overcomes a resistive force provided by the retention member 624 and the plunger 608 moves toward the second end 623 of the actuator portion 613. The moving plunger 608 retracts linkage 612, in turn retracting the valve 614 to establish fluid communication between the displacement chamber 605 and the sampling chamber 603 through the port 607. The incompressible fluid in the sampling chamber 603 then flows through the port 607 to the displacement chamber 605, activating the sampling mechanism 602 to capture a sample.

Figure 7:
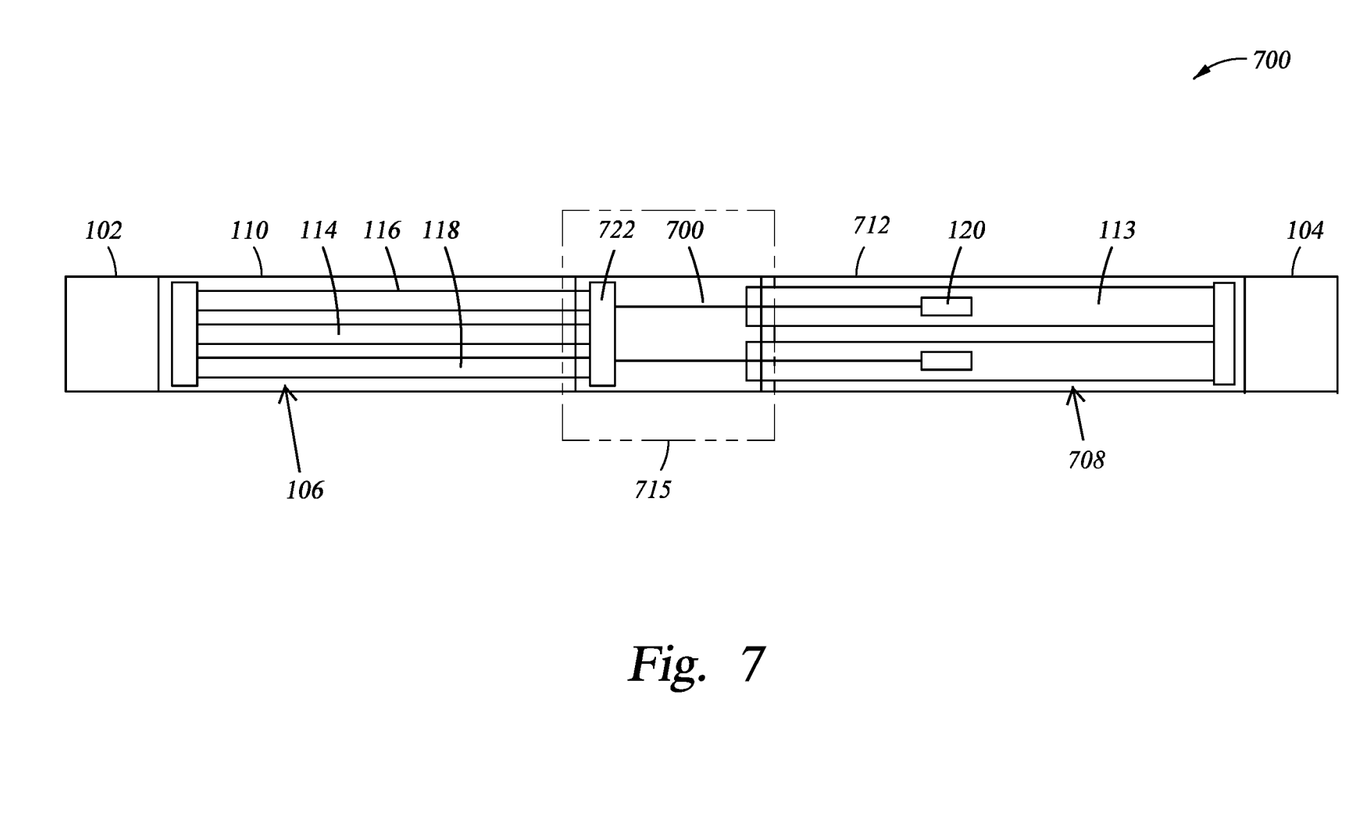
FIG. 7 is a schematic diagram summarizing the design architecture of a sampling mechanism according to another embodiment.

FIG. 7 is a schematic diagram summarizing the design architecture of a sampling mechanism 700 according to another embodiment. The sampling mechanism 700 uses samplers 113, which can be any of the samplers described elsewhere herein, each sampler 113 equipped with an electronic actuator 120. The sampling mechanism 700 has the top sub 102, the first housing 110, which houses the control assembly 106, coupled to the top sub 102, the bottom sub 104, and a second housing 712 housing a sampling assembly 708 containing the samplers 113 and the electronic actuators 120, the second housing 712 coupled between the bottom sub 104 and the first housing 110. A sampling sub 715 is coupled between the first housing 110 and the second housing 712. The top sub 102, bottom sub 104, first housing 110, and second housing 112 all have cylindrical profiles in many cases, but any cross-sectional profile would work with the sampling mechanisms described herein. The fluid produced from the reservoir during a well test flows through the top sub 102, first housing 110, sampling sub 715, second housing 112, and bottom sub 104.

The first housing 110 houses components of the control assembly 106 and the second housing 712 houses components, chiefly the samplers 113 and electronic actuators 120, of the sampling assembly 708. The sampling mechanism 700 is similar to the sampling mechanism 100 in many respects. The main difference between the two is the location of the electronic actuators 120, which in this case are members of the sampling assembly 708 located within the second housing 712. Thus, in this case, the sampling sub 715 does not include the electronic actuators 120. The sampling sub 715 includes a connector 722 connected to elements of the control assembly 106 and to the electronic actuators 120 to convey activation signals from the control assembly 106 to the electronic actuators 120. Here, the sampling assembly 708 is a fully functional sampling assembly 708 with actuation mechanism included. The sampling assembly 708 needs only electrical activation signals and power input to function.

Figure 8:
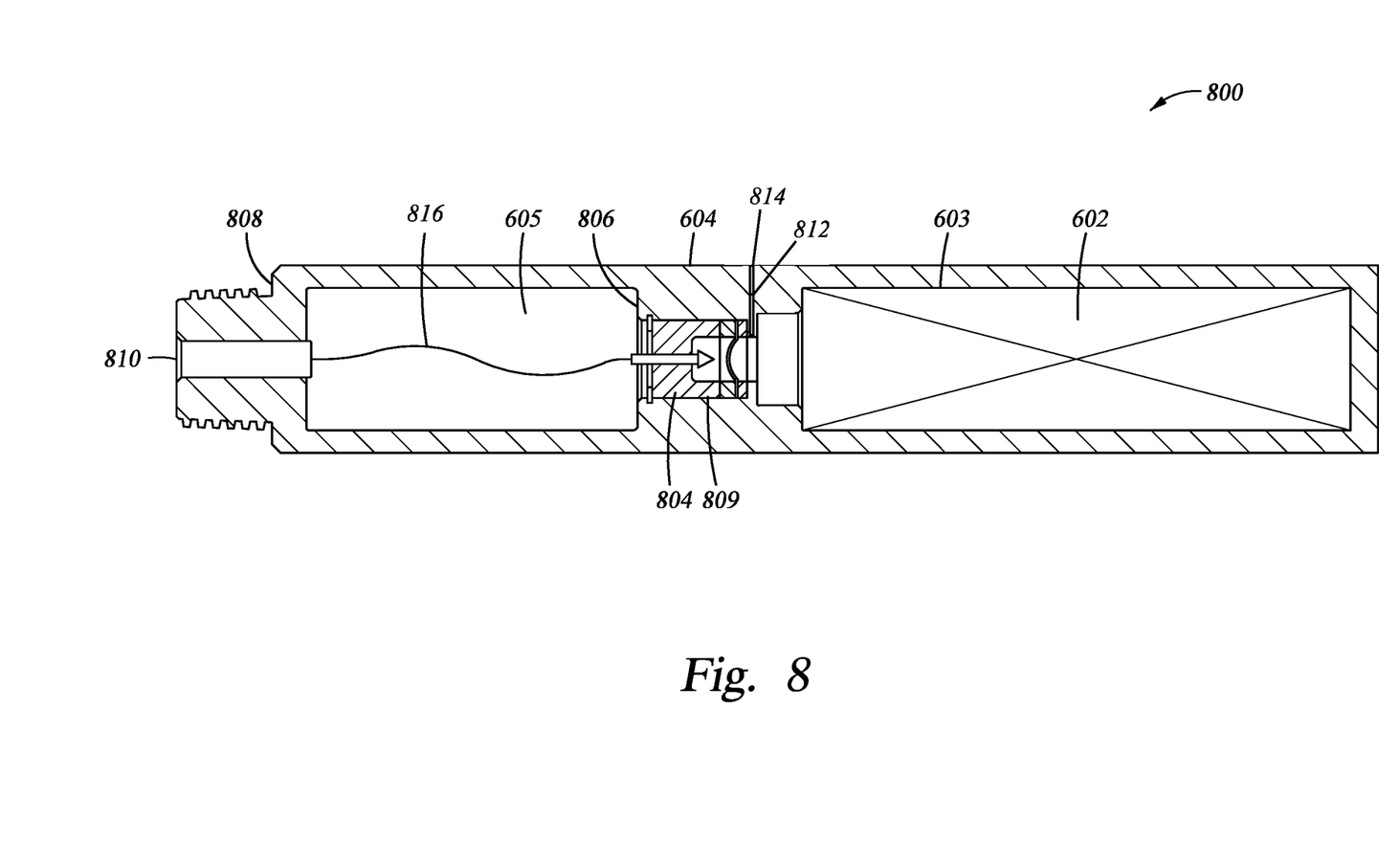
FIG. 8 is a cross-sectional view of a sampler according to another embodiment.

FIG. 8 is a cross-sectional view of a sampler 800 according to another embodiment. The sampler 800 can be used with the sampling mechanisms described elsewhere herein. The sampler 800 is similar in many respects to the sampler 600, the chief difference between the two being the actuation mechanism. Whereas the sampler 600 uses a valve linkage mechanism to actuate the sampler, the sampler 800 uses an electronic rupture disk assembly to actuate the sampler. The sampler 800 has the same sampling mechanism 602 as the sampler 600, but instead of the valve 614, linkage 612, and plunger 608, the sampler 800 has, disposed in the partition 604, an electronic rupture disk assembly 804 disposed against the port 607 that separates the displacement chamber 605 from the sampling chamber 603, with the port 607 located between the rupture disk assembly 804 and the sampling chamber 603. Thus, in the sampler 800, the actuation mechanism is effectively housed in the displacement chamber 605, and the sampler 800 does not have a separate actuation portion. The sampler 800 also features a passive pressure release 812 set to open in the event of overpressure of the sampling chamber 603. Here, the passive pressure release 812 is located in a port 814, which may be a lateral port, formed at the partition 604 that provides fluid communication between the sampling chamber 603 and the exterior of the sampler 800.

The rupture disk assembly 804 is located at a first end 806 of the displacement chamber 605 adjacent to the port 607 in a recess 809 formed in the partition 604 at the first end 806 of the displacement chamber 605. One or more seal members (not shown) may be provided to seal the rupture disk assembly 804 within the recess 809. A conduit 810, which may be the same as the conduit 640 of FIG. 6, is provided at a second end 808 of the displacement chamber 605 opposite from the first end 806. An electrical connector 816 is coupled from the conduit 810 to the rupture disk assembly 804, traversing the displacement chamber 605. The electrical connector 816 conveys electrical signals input at the conduit 810 to the rupture disk assembly 804 to open the port 607.

The sampler 800 is activated when an electrical signal is supplied to the sampler 800 via the conduit 810. The electrical signal will be passed through electrical connector 816 to the electronic rupture disk assembly 804. The electric signal activates the electronic rupture disk assembly 804, resulting in puncture of the disk element of the electronic rupture disk assembly 804, and opening the fluid path from the sampling chamber 603 to the displacement chamber 605, allowing the incompressible fluid to flow through the port 607 and activate the sampling mechanism 602.

The samplers and sampling mechanisms described herein feature a pressure source that is contained within the sampling mechanism along with local activation features that release the pressure source when activated remotely. Release of the pressure source moves a member of the sampler to allow sample fluids to flow into the sampler. In the sampling mechanisms 100, 200, and 400, and the sampler 300, the pressure source is a pressure member with a gas pressurized to a pressure selected to provide motive force to a sampler valve after expansion through a conduit. In the samplers 600 and 800, the pressure source is an incompressible fluid charged to the sampling portion at a pressure selected to maintain the sampler in a closed configuration until the pressure source is released into a displacement chamber. In each case, a local pressure release mechanism, actuated by electric or pressure signals, releases the pressure source to activate the sampler.

The two modes of pressure activation in these samplers are opposites, in a sense. While release of the pressure sources in the sampling mechanisms 100, 200, 300, and 400 raises pressure on a part of the sampler to activate the sampler, those in the samplers 600 and 800 lower a pressure to activate the sampler. In all cases, a local activator is coupled to the pressure source to release the pressure source and activate the pressure-activated sampler.

It should be noted that the different kinds of samplers described herein could be used in one sampling tool. One downhole tool may have multiple samplers, each of which may independently be the sampler 300, the sampler 600, or the sampler 800. Thus, one downhole tool may have some samplers activated by separate pressure members located within the sampling assembly while other samplers are activated by release of a pressure source within the sampling portions thereof. Likewise, one downhole tool can have one or more samplers of the valve-actuated type described herein along with one or more samplers of the rupture-dick-actuated type described herein. Each of the different samplers can be electrically coupled to one control assembly, which can interact with all the samplers in the same way.

While the foregoing is directed to embodiments, other and further embodiments of the present disclosure may be devised without departing from the basic scope thereof, and the scope thereof is determined by the claims that follow.

What is claimed is:

1. A sampling assembly, comprising:
   a body defining a sampling chamber, a displacement chamber, and a passage between the sampling chamber and the displacement chamber, wherein the body comprises an axis extending through the sampling chamber, the displacement chamber, and the passage, wherein the body defines a port positioned crosswise to the axis and configured to release overpressure within the sampling chamber, and wherein the body is configured to store a pressurized fluid as a pressure source in the sampling chamber;
   a pressure-activated sampler disposed in the sampling chamber; and
   an actuated pressure applicator fluidly coupled to the pressure-activated sampler, wherein the actuated pressure applicator comprises an electronic rupture disk having a rupture member configured to hold the pressurized fluid in the sampling chamber, wherein the electronic rupture disk comprises a remotely-operated local actuator configured to pierce the rupture member to release the pressurized fluid to flow from the sampling chamber, through the passage, to the displacement chamber, wherein the pressure-activated sampler is configured to receive a sample of a reservoir fluid of a well in response to pressure activation caused by the release of the pressurized fluid, and wherein the rupture member is disposed in the passage, the rupture member extends crosswise to the axis, and the port intersects the passage.

2. The sampling assembly of claim 1, wherein the remotely-operated local actuator is activated by a signal from a communication member.

3. The sampling assembly of claim 1, wherein the pressurized fluid comprises a pressurized gas as the pressure source.

4. The sampling assembly of claim 1, further comprising a controller coupled to the remotely-operated local actuator and a communication member coupled to the controller, wherein the communication member is an electronic, optical, or acoustic member.

5. The sampling assembly of claim 1, wherein the port is positioned perpendicular to the axis.

6. The sampling assembly of claim 1, further comprising a passive pressure release disposed in the port and fluidly coupled to the pressure-activated sampler, wherein the passive pressure release is configured to open to release pressure in response to the overpressure of the sampling chamber.

7. The sampling assembly of claim 1, wherein the well comprises an oil and gas well.

8. The sampling assembly of claim 1, wherein the pressure-activated sampler is disposed in a closed position while the pressurized fluid is stored as the pressure source, and the pressure-activated sampler is configured to transition from the closed position to an open position in response to the pressure activation.

9. The sampling assembly of claim 1, wherein the pressurized fluid comprises an incompressible fluid as the pressure source.

10. The sampling assembly of claim 1, wherein the axis is a central axis of the body, wherein the sampling chamber, the displacement chamber, and the passage are centered along the central axis.

11. A sampling assembly, comprising:
    a plurality of pressure-activated samplers;
    a plurality of actuated pressure applicators fluidly coupled to the plurality of pressure- activated samplers, each actuated pressure applicator of the plurality of actuated pressure applicators comprising:
       a first chamber, a second chamber, and a passage between the first chamber and the second chamber, wherein an axis extends through the first chamber, the second chamber, and the passage, wherein a port is positioned crosswise to the axis and configured to release overpressure within the first chamber, and wherein each actuated pressure applicator of the plurality of actuated pressure applicators is configured to store a pressurized fluid as a pressure source in the first chamber; and
       an electronic rupture disk comprising a remotely-operated local actuator and a rupture member coupled to the passage, wherein the rupture member is configured to hold the pressurized fluid in the first chamber, wherein the remotely-operated local actuator is configured to pierce the rupture member to release the pressurized fluid to flow from the first chamber to the second chamber, and wherein the rupture member is disposed in the passage, the rupture member extends crosswise to the axis, and the port intersects the passage; and
    a controller configured to receive a signal representing one actuated pressure applicator of the plurality of actuated pressure applicators and to activate the one actuated pressure applicator represented by the signal to release the pressurized fluid to flow through the passage between the first and second chambers, wherein one pressure-activated sampler of the plurality of pressure-activated samplers is configured to receive a sample of a reservoir fluid of a well in response to a pressure activation caused by the release of the pressurized fluid.

12. The sampling assembly of claim 11, wherein the port is positioned perpendicular to the axis.

13. The sampling assembly of claim 11, further comprising a passive pressure release disposed in the port, wherein the passive pressure release is configured to open to release pressure in response to the overpressure of the first chamber.

14. The sampling assembly of claim 11, further comprising a communication member coupled to the controller.

15. The sampling assembly of claim 11, wherein the pressurized fluid comprises an incompressible fluid or a pressurized gas as the pressure source.

16. A sampling assembly, comprising:
a body defining a first chamber, a second chamber, and a passage between the first chamber and the second chamber, wherein the body comprises an axis extending through the first chamber, the second chamber, and the passage, wherein the body defines a port positioned crosswise to the axis and configured to release overpressure within the first chamber, and wherein the body is configured to store a pressurized fluid as a pressure source in the first chamber;
a pressure-activated sampler disposed in the first chamber; and
an actuated pressure applicator comprising an electronic rupture disk configured to release the pressurized fluid to flow through the passage between the first and second chambers, wherein the electronic rupture disk comprises a rupture member configured to hold the pressurized fluid in the first chamber, wherein the electronic rupture disk comprises an actuator configured to pierce the rupture member to release the pressurized fluid from the first chamber, through the passage, and to the second chamber, wherein the rupture member is disposed in the passage, the rupture member extends crosswise to the axis, and the port intersects the passage, and wherein the pressure-activated sampler is configured to receive a sample of a reservoir fluid of a well in response to a pressure activation caused by the release of the pressurized fluid.

17. The sampling assembly of claim 16, wherein the first chamber comprises a sampling chamber, the second chamber comprises a displacement chamber, the body is configured to store the pressurized fluid as the pressure source in the sampling chamber, the sample of the reservoir fluid of the well comprises oil or gas, and the pressurized fluid comprises an incompressible fluid or a pressurized gas.

18. The sampling assembly of claim 16, wherein the port is positioned perpendicular to the axis.

19. The sampling assembly of claim 16, wherein the sampling assembly is configured to be lowered through a wellbore to a downhole location to collect the sample.

* * * * *